(12) United States Patent
Kirkwood et al.

(10) Patent No.: US 7,810,757 B2
(45) Date of Patent: Oct. 12, 2010

(54) MOUNTING DEVICE FOR AN AIRCRAFT

(75) Inventors: Brad L Kirkwood, Kent, WA (US);
Paul S. Gregg, Normandy Park, WA (US); Gerald D. Miller, Mercer Island, WA (US); Jeff D. Will, Renton, WA (US); David W. Evans, Kent, WA (US)

(73) Assignee: The Boeing Company, Chicago, IL (US)

( * ) Notice: Subject to any disclaimer, the term of this patent is extended or adjusted under 35 U.S.C. 154(b) by 959 days.

(21) Appl. No.: 11/556,125

(22) Filed: Nov. 2, 2006

(65) Prior Publication Data
US 2010/0162567 A1    Jul. 1, 2010

(51) Int. Cl.
*B64C 3/26* (2006.01)
(52) U.S. Cl. .................................. 244/123.1
(58) Field of Classification Search ............... 244/123.1, 244/119, 117 R, 120, 123.12, 123.13, 123.14, 244/123.2, 123.3, 123.4, 123.7, 123.8, 131, 244/132
See application file for complete search history.

(56) References Cited

U.S. PATENT DOCUMENTS

| | | | | |
|---|---|---|---|---|
| 1,428,714 A | * | 9/1922 | Schwamb et al. | 244/123.8 |
| 1,907,002 A | | 5/1933 | Ragsdale | |
| 1,988,085 A | * | 1/1935 | Orlando | 244/131 |
| 1,999,372 A | | 4/1935 | Ragsdale | |
| RE21,921 E | * | 10/1941 | Greulich | 52/838 |
| 4,395,450 A | * | 7/1983 | Whitener | 428/116 |
| 4,671,470 A | * | 6/1987 | Jonas | 244/119 |
| 5,316,810 A | | 5/1994 | Rogerson | |
| 5,829,716 A | | 11/1998 | Kirkwood | |
| 6,178,713 B1 | | 1/2001 | Delie et al. | |
| 6,374,570 B1 | | 4/2002 | McKague, Jr. | |
| 6,945,727 B2 | * | 9/2005 | Christman et al. | 403/109.8 |
| 7,371,304 B2 | * | 5/2008 | Christman et al. | 156/293 |
| 7,393,488 B2 | * | 7/2008 | Grose et al. | 264/254 |
| 2005/0247818 A1 | | 11/2005 | Prichard et al. | |
| 2006/0145010 A1 | * | 7/2006 | Schmidt et al. | 244/123.8 |
| 2009/0053175 A1 | | 2/2009 | Or et al. | |

FOREIGN PATENT DOCUMENTS

EP    0 485 027 A2    5/1992
EP    0 485 027 A3    5/1992

OTHER PUBLICATIONS

Invitation to Pay Additional Fees for International Application No. PCT/US2007/022687 dated Dec. 5, 2008, 7 pages.
International Search Report for International Application No. PCT/US2007/022687 dated Feb. 3, 2009, 15 pages.

* cited by examiner

*Primary Examiner*—Tien Dinh
(74) *Attorney, Agent, or Firm*—Klintworth & Rozenblatt IP LLC

(57) ABSTRACT

The invention relates to a mounting device in an aircraft. In one aspect of the invention, a method is disclosed for assembling a metal securement member of the mounting device. In another aspect of the invention, a mounting device is disclosed. In another aspect of the invention, a method is disclosed for installing and using a mounting device in an aircraft.

27 Claims, 7 Drawing Sheets

MOUNTING DEVICE FOR AN AIRCRAFT

BACKGROUND OF THE INVENTION

There are a variety of mounting devices and methods of using mounting devices in the art of manufacturing aircraft. Some of these mounting devices when installed in aircraft wings cause imperfections on the surface of the aircraft wing which can increase undesirable turbulent flow and drag over the wing. In addition, some of the mounting devices used in the art do not contribute enough stiffness and strength to aircraft wings and fuselage. Further, some of the mounting devices do not adequately secure structures within aircraft. A mounting device, and method for its use, is needed which may solve one or more problems in one or more of the existing mounting devices used in aircraft.

SUMMARY OF THE INVENTION

In one aspect of the invention, a method is disclosed for assembling a metal securement member. The method comprises holding at lest two metal sheets in a predetermined position, welding the sheets together with the sheets held in the predetermined position, and annealing the sheets with maintaining the sheets held in the predetermined position. A clamping assembly which can be used with the method for assembling the metal securement member is also disclosed.

In another aspect of the invention, a mounting device is disclosed. The mounting device comprises a metal securement member and a composite member attached to the metal securement member and positioned within a channel formed in a structural member of an aircraft. The metal securement member can be configured in the form of at least one of a pi chord, T chord, J chord, I beam, sinewave beam, and F beam. The metal securement member can be constructed of titanium. The composite member can be constructed of a graphite fiber epoxy laminate.

One example of the mounting device comprises a titanium alloy securement member comprising a cap member and two spaced apart arms connected to and extending from a first surface of the cap member and a graphite fiber epoxy laminate member attached to a second surface of the cap member, opposite the first, and positioned within a channel formed in a wing of an aircraft.

In another aspect of the invention, a method is disclosed for installing a mounting device in a structural member of an aircraft. The method comprising the steps of positioning a mounting device within a channel formed in the structural member, wherein the mounting device comprises a metal securement member and a composite member attached to the metal securement member, and attaching the composite member to the structural member within the channel.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
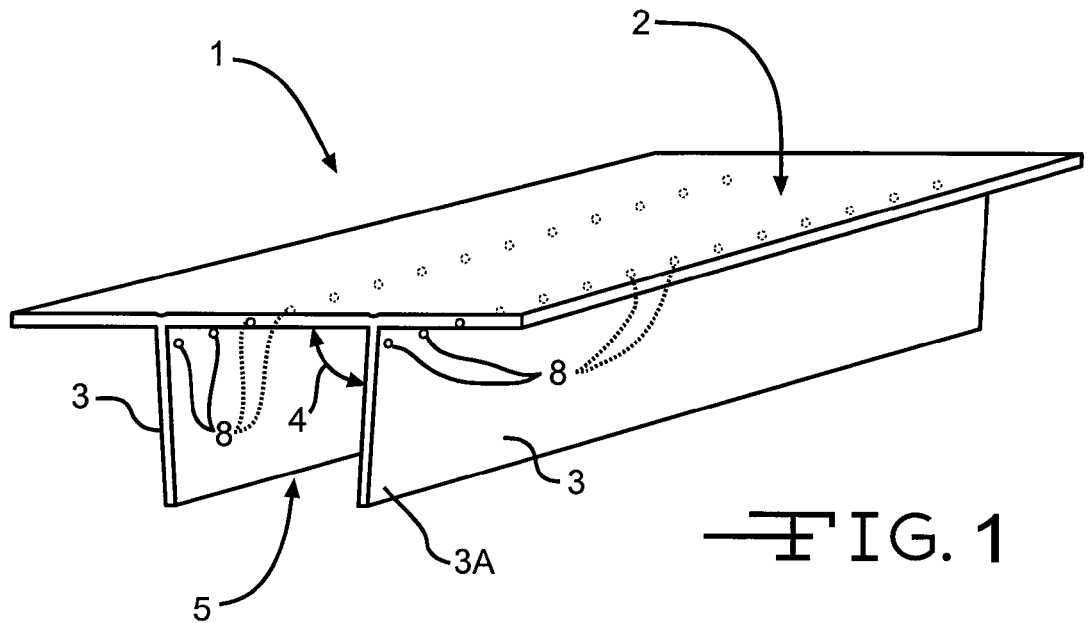
FIG. 1 is a top perspective view of an embodiment of the metal securement member in the configuration of a pi chord.

As shown in FIG. 1, in one example of the invention, a metal securement member can be configured in the form of a pi chord (1). Pi chord (1) is constructed of a cap (2) and two spaced apart arms (3) secured to and extending from the same side of the cap (2). Pi chord (1) generally resembles the shape of the Greek letter $\pi$ (pi). Pi chord (1) in this example provides a pinch angle (4) where spaced apart arms (3) pinch or converge toward one another as they extend from cap (2) at an angle relative to cap (2). The space between spaced apart arms (3) form a slot (5). Cap (2) and spaced apart arms (3) in this example are constructed of three sheets of metal. The metal can be a titanium alloy.

In one example the titanium alloy can be a alpha-beta titanium alloy, such as, for example, Ti-6 Al-4V or Ti 3Al-2.5 V, or a precipitation hardened metastable beta titanium alloy, such as, for example, Ti 15-3-3-3, Beta 21S, or VT-22. A particularly useful example of metastable beta titanium alloy for use in this invention posses the properties of high yield strength of approximately 180 to 200 Ksi, a modulus of approximately 14.5 to 15 Msi, and a coefficient of thermal expansion of approximately $5.1 \times 10-6$/degree Fahrenheit. The titanium alloy sheets can be between 0.020" to 0.20" thick.

Figure 9:
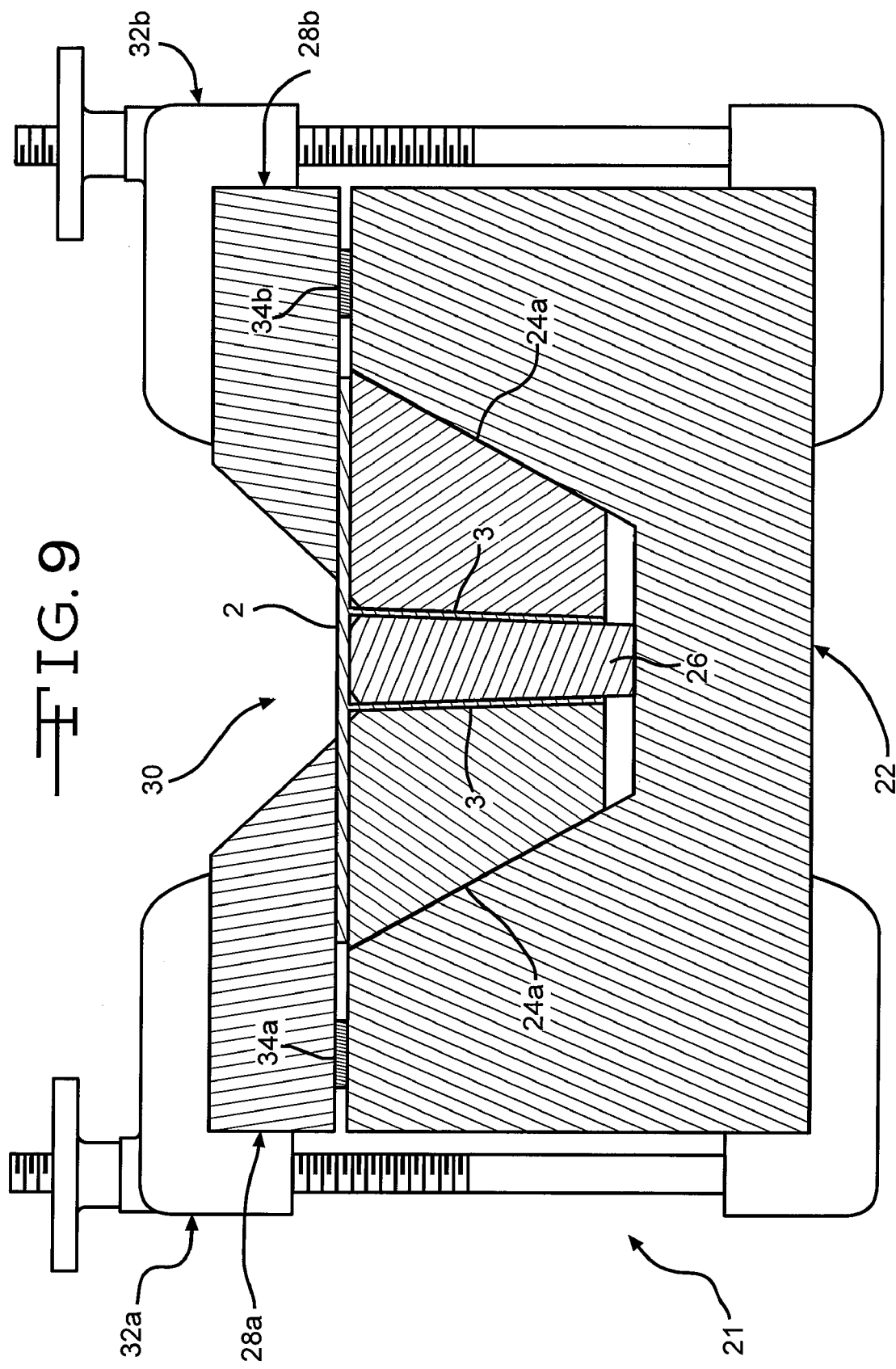
FIG. 9 is an end elevational view of an embodiment of the constraint and fixture tool used to construct an embodiment of the metal securement member in the configuration of a pi chord.
Figure 10:
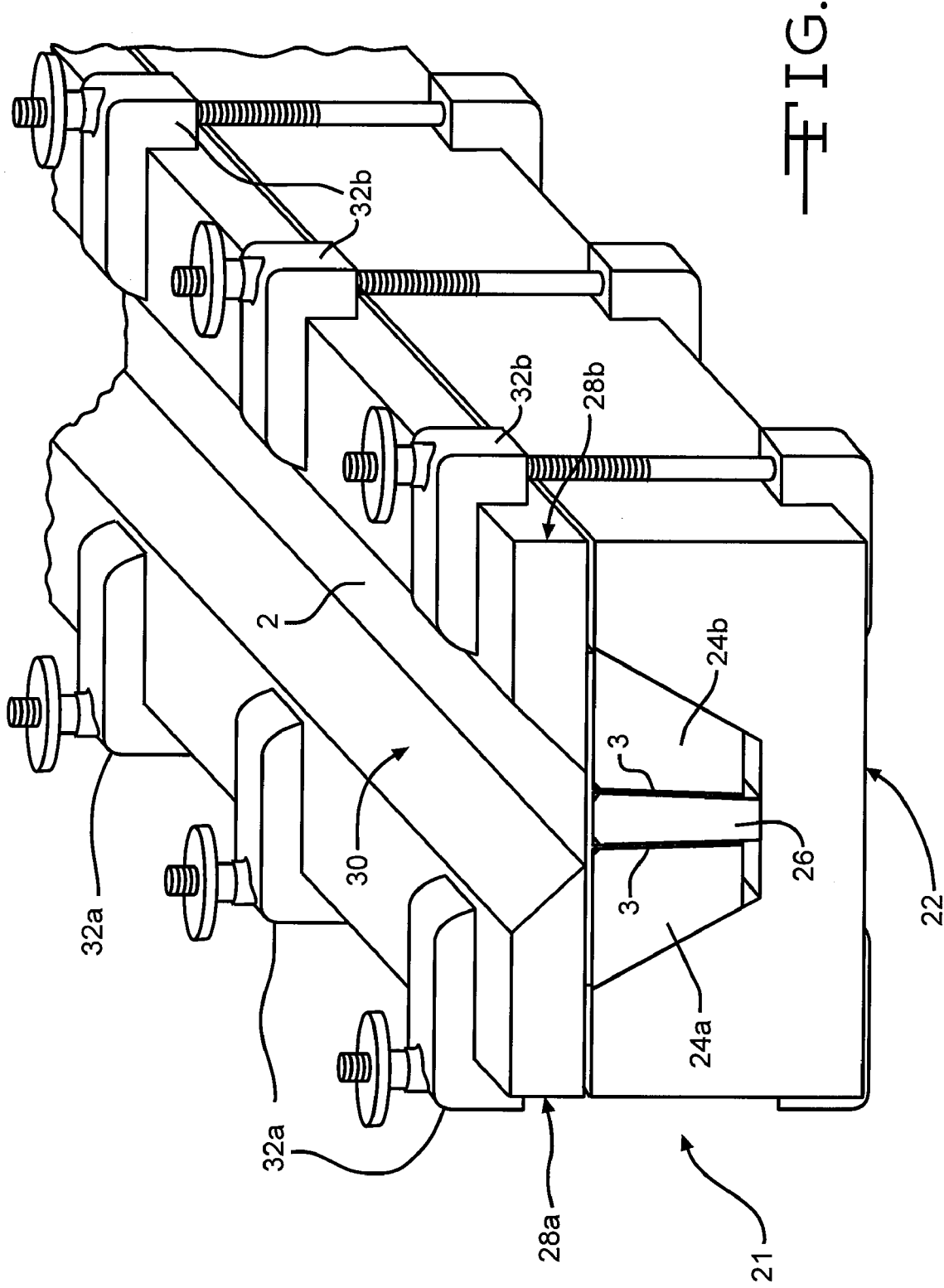
FIG. 10 is a top perspective view of FIG. 9.

In one example of the invention, the metal securement member can be made by using a novel method of assembly disclosed herein. For example, pi chord (1) can be manufactured using this method by holding spaced apart arms (3) in contact with cap (2) throughout the welding and annealing steps. Holding spaced apart arms (3) to cap (2) throughout both the welding and annealing steps prevents pi chord (1) from distorting in configuration. Distortion can occur if the components were otherwise released between the welding and annealing steps. The holding of spaced apart arms (3) to cap (2) can be performed by a constraint and fixture tool. An example a constraint and fixture tool (21) used to make a metal securement member in the configuration of a pi chord is shown in FIGS. 9 and 10. The welding can be performed by utilizing laser, plasma arc, or gas tungsten arc stake welding. The annealing can take place in a vacuum furnace. This method can be used to make a welded joint between any number of metal sheets, including but not limited to metal sheets made of titanium alloy, aluminum, steel, stainless steel, and nickel based alloys. This method can be used to fabricate metal securement members of different shapes, including but not limited to T and J chords; I and sinewave beams; and F beams in either straight or curved sections.

FIGS. 9 and 10 show an example of a constraint and fixture tool (21) used to construct a metal securement member in the configuration of a pi chord (1). Three sheets of metal are held in the configuration of a pi chord by using a block (22), wedges (24a and 24b), an insert (26), and cap clamps (28a and 28b), as shown in FIGS. 9 and 10. Clamps (32a and 32b) and spacers (34a and 34b) are used to constrain and fix the tool so that the spaced apart arms (3) and the cap (2) are configured and held in a desired position. The cap clamps (28a and 28b) are configured so that a weld trough (30) is defined where the spaced apart arms (3) contact the cap (2) to allow access for welding. The constraint fixture tool (21) of FIGS. 9 and 10 can be used to construct pi chords (1) with slots (5) of various width by changing the width of the insert (26). As the width of the insert (26) increases, the wedges (24a and 24b) will set at a higher position relative to the bottom of the block (22). This design allows the constraint and fixture tool (21) to be used to construct pi chords with different slot widths without having to change all the components of the fixture tool (21).

In one example, this method is employed in the construction of a metal securement members made of titanium alloy. When using this method in the construction of a metal securement member made of titanium alloy, the annealing step can be performed in a vacuum furnace at about 900 to 1000 degrees Fahrenheit for one-half to four hours for metastable beta titanium alloys or a about 1400 to 1450 degrees Fahrenheit for 15 to 30 minutes for alpha-beta titanium alloys. Benefits of the annealing step include, but are not limited to stress relief and precipitation strengthening for the metastable beta titanium alloys and residual stress relief for the alpha-beta titanium alloys.

In another example, holes (8) are defined in the spaced apart arms (3). Holes (8) can be positioned closer to the cap than the distal end of an arm (3a) and can be positioned along the length of pi chord (1). As will be described below, holes (8) can be utilized to permit adhesive (18) to pass from slot (5) or inside arms (3) to outside arms (3).

Figure 2:
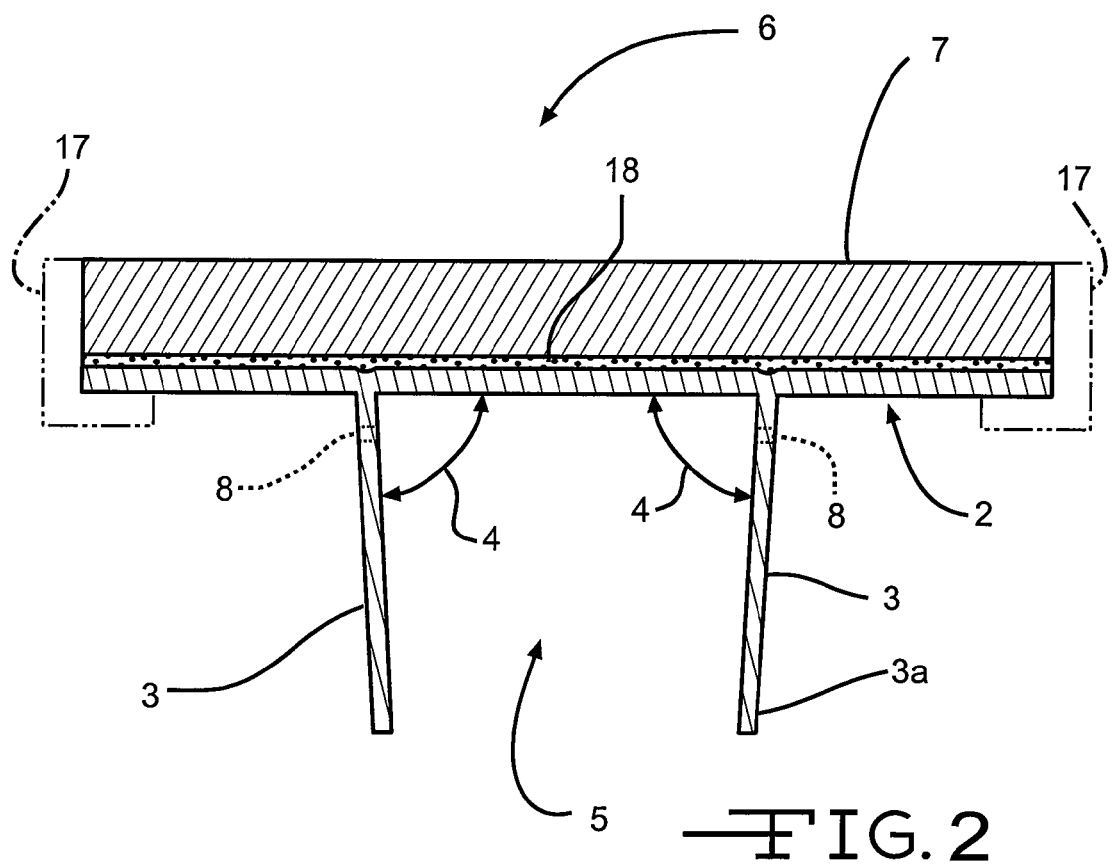
FIG. 2 is an end elevational view of an embodiment of the mounting device of the present invention.

As shown in FIG. 2, in one example of mounting device (6) a composite member (7) is bonded to cap (2) of pi chord (1). The composite member can be constructed of a graphite composite material using thermoset resin or a thermoplastic resin matrix. Suitable thermoset resins include, but are not limited to, epoxy, bismaleimide ("BMI"), and polyimide ("PI"). Suitable thermoplastic resins include, but are not limited to, polyetheretherketone ("PEEK"), polyetherketoneketone ("PEKK"), polyetherimide ("PEI"), and polyphenylene sulfide ("PPS"). The graphite composite material can have a lay-up of approximately 70 to 80% zero degree oriented fibers and approximately 20 to 30% forty five degree oriented fibers. The graphite fiber used to construct the graphite composite material is preferably a polyacrylonitrile ("PAN") derived fiber with an elastic modulus of 44 Msi (IM-7 fiber) to 65 Msi (M46J fiber) with a 1.2 to 1.5% strain to failure.

As mentioned above, pi chord (1) can be made of a titanium alloy. One benefit of a mounting device (6) with a pi chord (1) constructed of titanium alloy includes but is not limited to a high shear strength at the joint where spaced apart arms (3) contact cap (2). The greater shear strength at this joint provides many benefits, including but not limited to allowing pi chord (1) to be stiffer and thinner than pi chords constructed of other metals.

In another example of mounting device (6), pi chord (1) is constructed of a titanium alloy and composite member (7) is constructed of a graphite fiber epoxy laminate composite material that utilizes PAN derived graphite fibers. One benefit of this example is that the titanium alloy and the graphite fiber epoxy laminate composite have similar coefficients of thermal expansion, thereby reducing the amount of internal thermal stresses that can result in either the warping of mounting device (6) or separation of composite member (7) from pi chord (1). Another benefit of this example is that the high strain to yield of titanium alloys, particularly metastable beta titanium alloys, correspond to the strain to failure of PAN derived graphite fibers, thereby creating efficient structures.

In the example shown in FIG. 2, a composite member (7) that is precured can be bonded to cap (2) using a bonding agent, other adhesive, or both (18). The bonding agent can be a SOL-GEL as disclosed in U.S. Pat. Nos. 6,797,376; 6,770,371; 6,037,060; 5,869140; 5,814,137 and related patents. The other adhesive can be, for example, a polymeric film adhesive (such as FM-300), a paste adhesive, a thermoplastic resin film, or other suitable adhesives used by those skilled in the art. Composite member (7) can be coextensive with the surface of cap (2) or extend beyond the perimeter of cap (2). Composite member (7) can also extend beyond the perimeter of cap (2) and wrap (17) around it to come in contact with the under side of cap (2). Should wrapping of composite member (7) around cap (2) be employed, the wrap (17) structure prevents composite member (7) from separating from cap (2) if the bond between the two were to fail. All or a portion of mounting device (6) with composite member (7) bonded to cap (2) can be vacuum bagged and cured in an oven at about atmospheric pressure or in an autoclave at greater than atmospheric pressure, preferably at about 80 to 200 psia.

In another example, composite member (7) can be co-cured directly onto cap (2) of pi chord (1). A bonding agent, other adhesive, or both can be applied to the surface of cap (2) to facilitate bonding of composite member to cap (2) during curing. In one example, composite member (7) can be constructed of composite plies that can be lay-ed up on the cap, thereby using it as the lay-up mandrel tool. Composite member (7) can be coextensive with the surface of cap (2) or extend beyond the perimeter of cap (2). Composite member (7) can also extend beyond the perimeter of cap and wrap (17) around it to come in contact with the under side of cap (2). All or a portion of mounting device (6) with composite member (7) co-cured directly to cap (2) can be vacuum bagged and cured in an oven at about atmospheric pressure or in an autoclave at greater than atmospheric pressure, preferably at about 80 to 200 psia.

Figure 3:
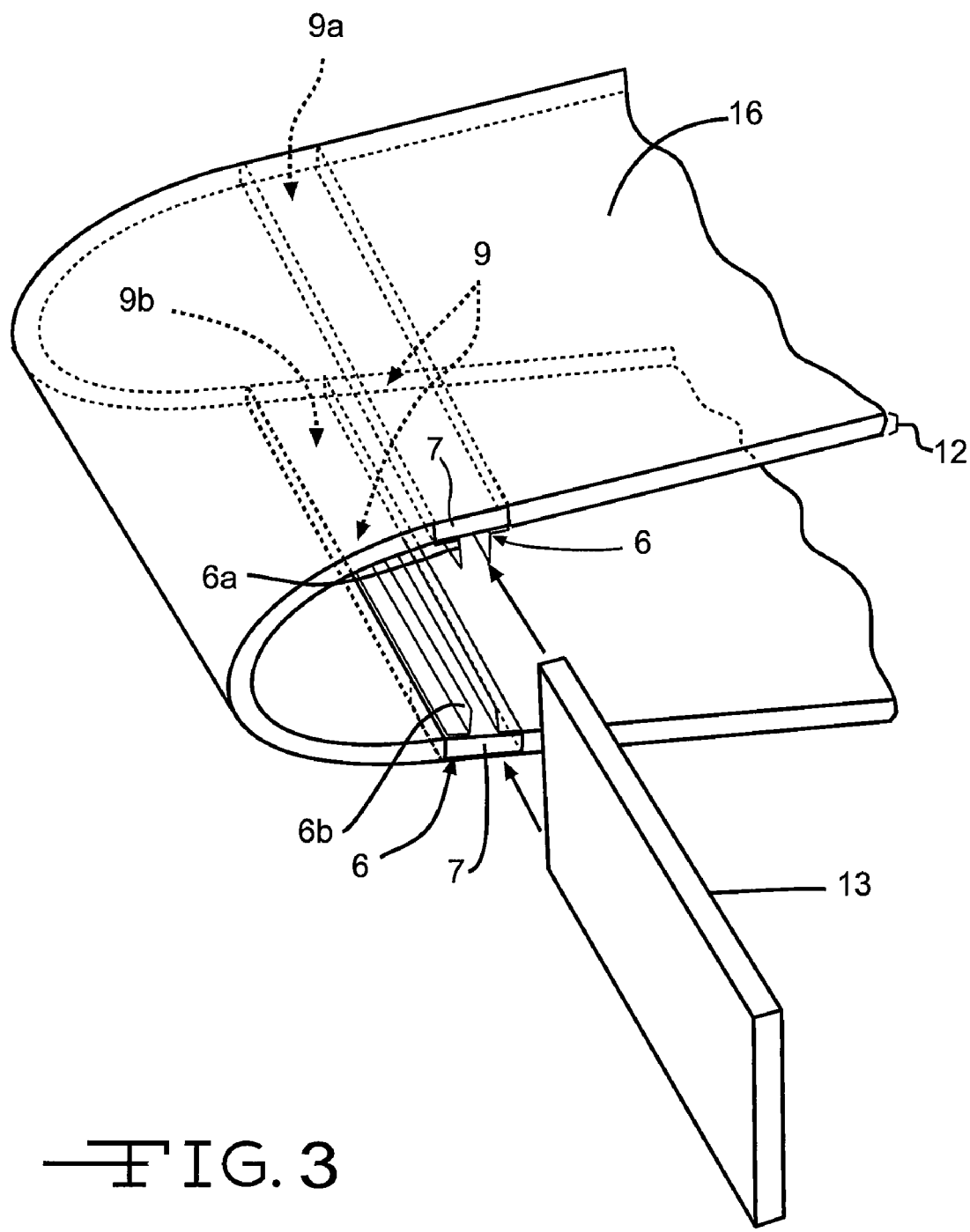
FIG. 3 is a partially cut away top perspective view of a wing of an aircraft with an embodiment of the mounting device of the present invention mounted thereto.
Figure 4:
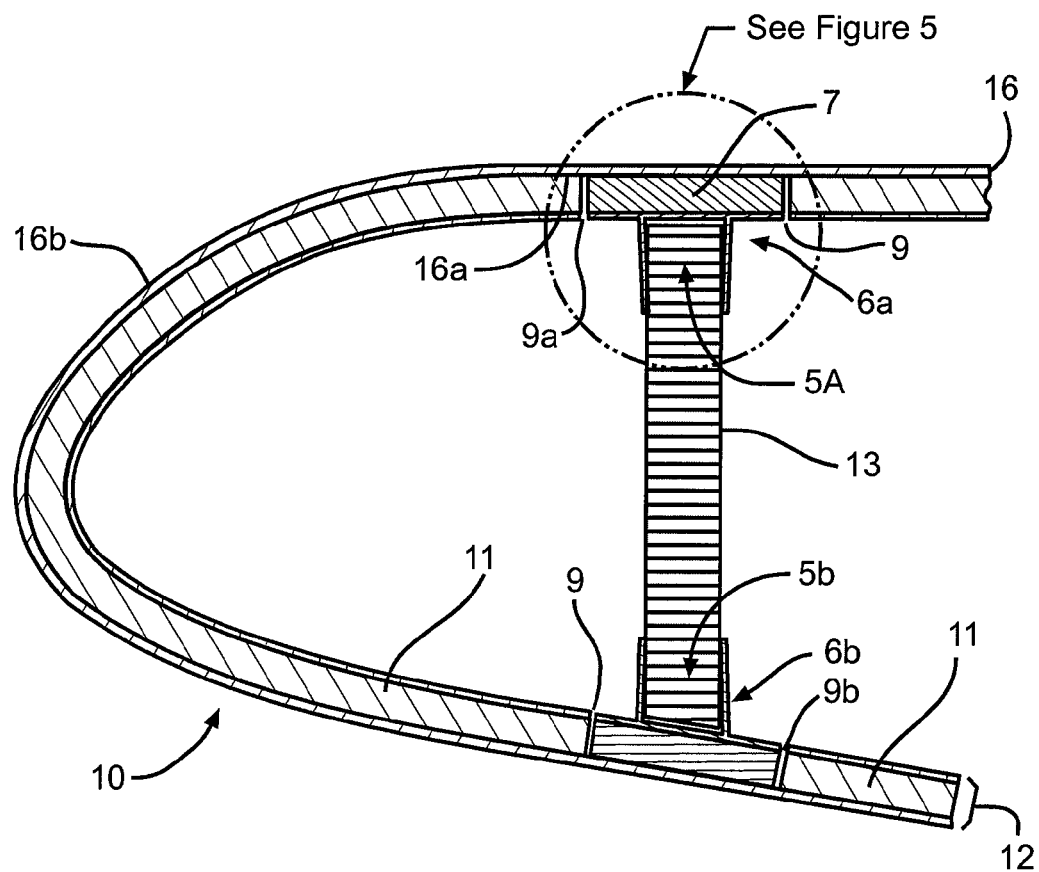
FIG. 4 is an end elevational view of FIG. 3 with a spar engaged to the mounting device of the present invention.

Mounting device (6) can be installed into channel (9) defined in core (11) of skin (12) of an aircraft wing (10). As shown in FIGS. 3 and 4, an example of channel (9) can be defined in core (11) and up to inside mold line (16a) of outer skin (16) of aircraft wing (10). The thickness of composite member (7) of mounting device (6) can correspond to the thickness of core (11) of skin (12) along the length of aircraft wing (10). Mounting device (6) can be secured into channel (9) by using a bonding agent, other adhesive, or both. Mounting device (6) can also be secured into channel (9) by co-curing mounting device (6) to inside mold line (16a) of outer skin (16) of aircraft wing (10). All or a portion of the assembly can be can be vacuum bagged and cured in an oven at about atmospheric pressure or in an autoclave at greater than atmospheric pressure, preferably at about 80 to 200 psia.

Figure 5:
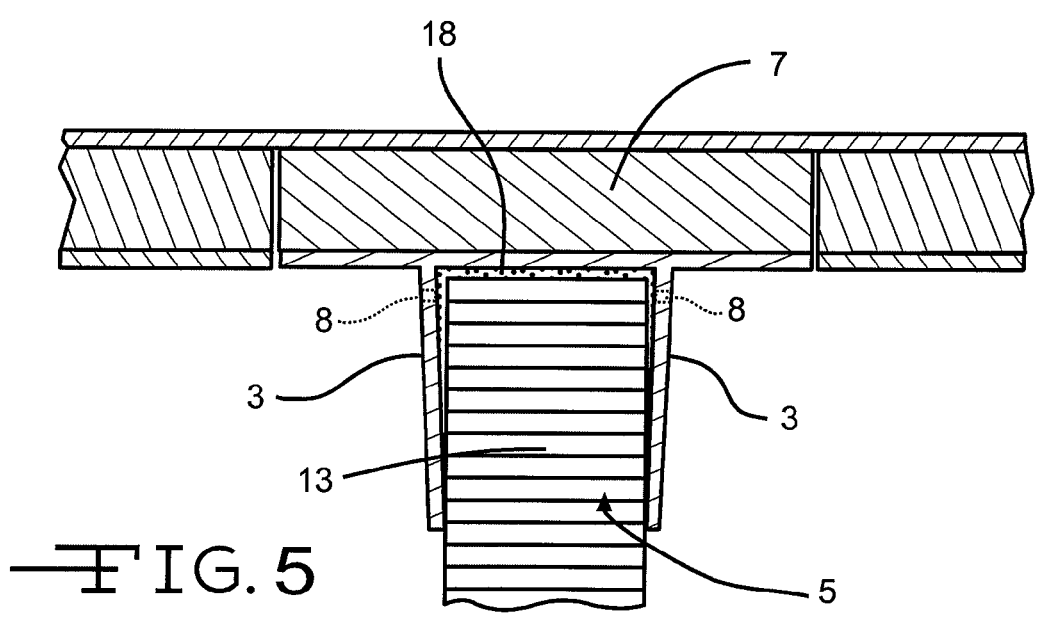
FIG. 5 is an enlarged view of a portion of FIG. 4.

As shown in FIG. 4, in one example, composite member (7) of upper and lower mounting devices, (6a) and (6b), can be inserted into opposing channels, (9a) and (9b), in place of, for example, core (11) of skin (12) of aircraft wing (10). All or a portion of the assembly can be can be vacuum bagged and cured in an oven at about atmospheric pressure or in an autoclave at greater than atmospheric pressure, preferably at about 80 to 200 psia. Spar web panel (13) can be inserted into the upper and lower slots, (5a) and (5b), of mounting devices, (6a) and (6b). In an example of mounting device (6) with pinch angles (4), spaced apart arms (3) can pinch or engage spar web panel (13). A bonding agent, other adhesive, or both can be used to further secure spar web panel (13) to mounting device (6). A tight fit between spaced apart arms (3) and spar web panel (13) is preferred in part because it can allow the use of a higher strength adhesive between spaced apart arms (3) and spar web panel (13). If a bonding agent, other adhesives, or both (18) are used to secure spar web panel (13) to mounting device (6), any excess can seep out holes (8), thereby allowing for slot (5) to be filled, as shown in FIG. 5. A paste adhesive is preferred to fill any gaps between the cap (2) and the spar web panel (13) in the slot (5). All or a portion of the assembly, of the upper and lower mounting devices, (6a) and (6b), in opposing channels, (9a) and (9b), with spar web panel installed, of aircraft wing (10) can also be vacuum bagged and cured in an oven at about atmospheric pressure or in an autoclave at greater than atmospheric pressure, preferably at about 80 to 200 psia.

In the example shown in FIG. 4, mounting device (6) can comprise composite member (7) constructed of a graphite fiber epoxy laminate composite material and pi chord (1) constructed of a titanium alloy. One benefit of such an example is increased stiffness in aircraft wing (10).

Figure 6:
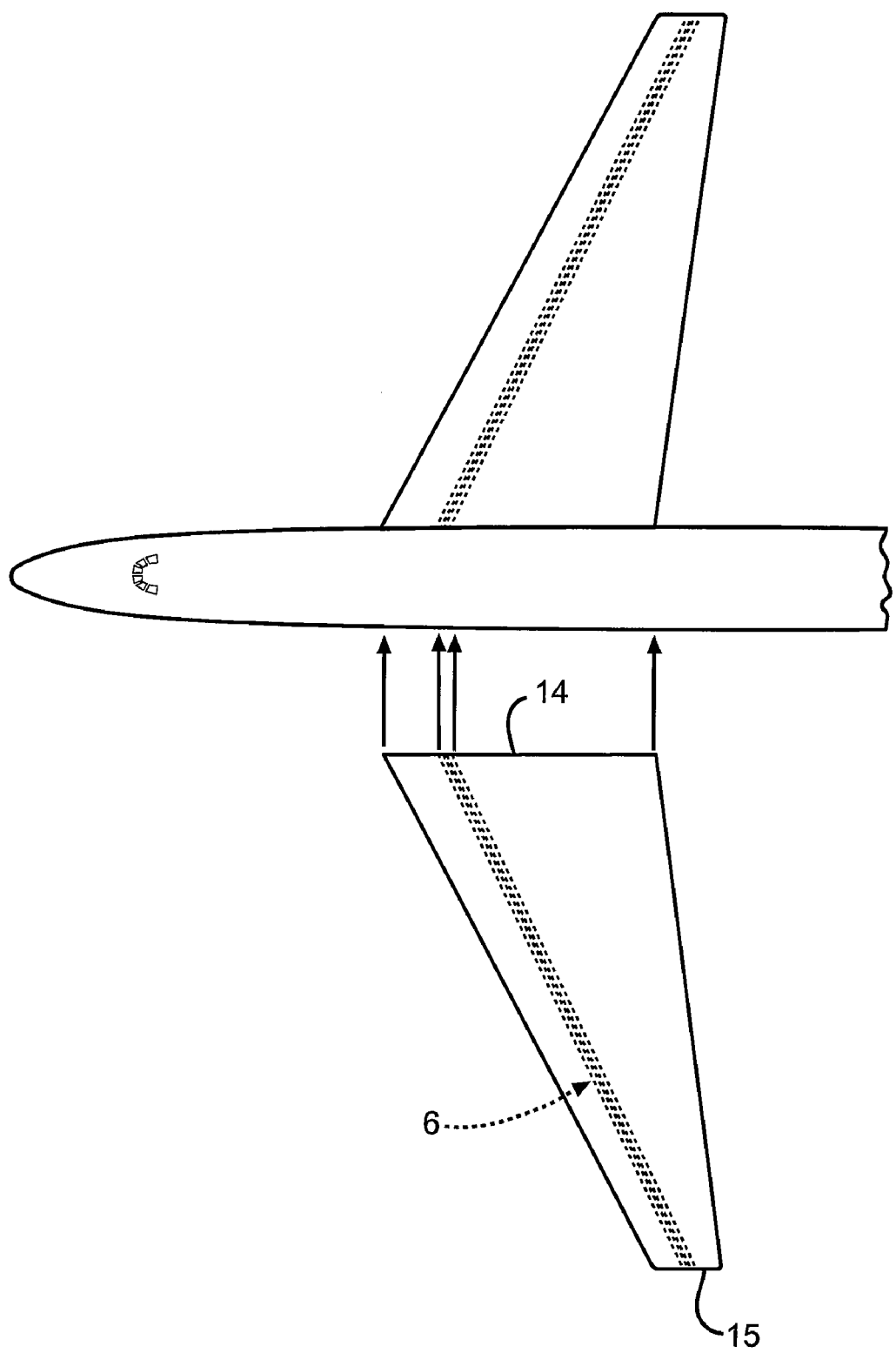
FIG. 6 is a top plan view of an aircraft wing being installed on an aircraft with an embodiment of the mounting device of the present invention installed along the length of the aircraft wing.

In the example shown in FIGS. 3, 4, and 6, spar web panel (13) can be trimmed to the taper of wing (10) and inserted into both the upper and lower slots, (5a) and (5b), of mounting devices, (6a) and (6b), from wing root (14) to tip (15) of the wing (10). Spar (13) can be secured to the mounting devices, (6a) and (6b), as described above. All or a portion of the assembly can be vacuum bagged and cured in an oven at about atmospheric pressure or in an autoclave at greater than atmospheric pressure, preferably at about 80 to 200 psia.

One benefit of the example shown in FIGS. 3, 4, and 6 is that edges of spar web (13) do not need to abut cap (2) along the length of mounting device (6) to be adequately secured within arms (3). Such an example, therefore, can allow for a dimensional mismatch between spar web panel (13) and the underside of caps (2) of two opposing mounting devices, (6a) and (6b). Benefits of such an example include but are not limited to simplified assembly and reduced incidence of "pull-in" or surface wave of outer mold line (16b) of outer skin (16) of wing (10). The later being a contributor to undesirable turbulent flow and drag over the surface of the wing.

Figure 7:
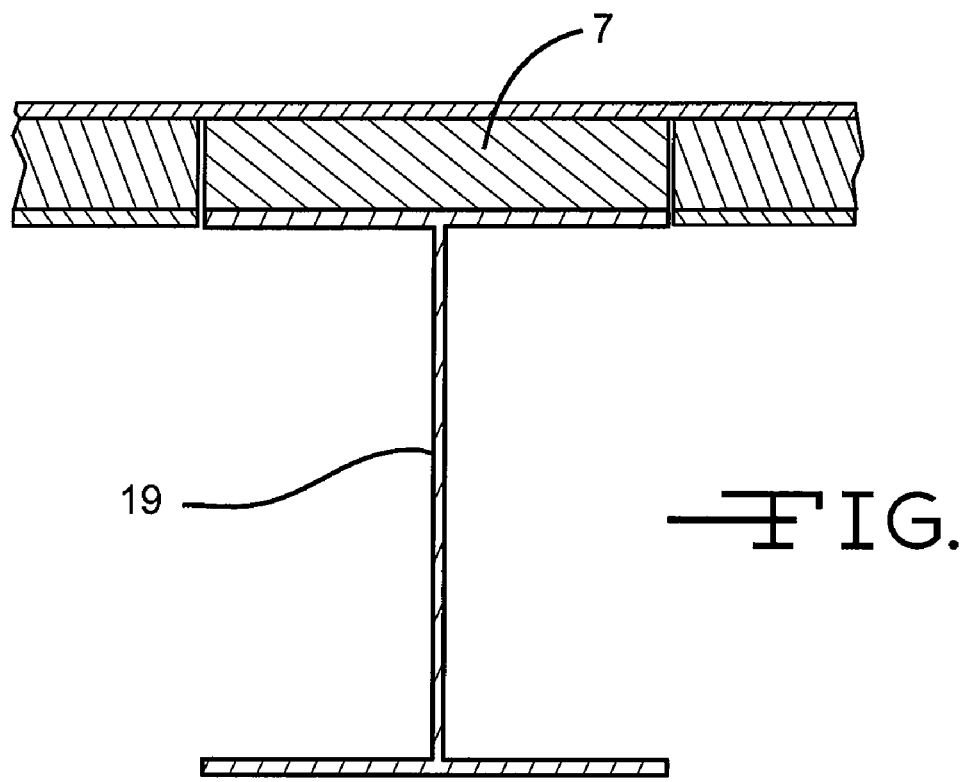
FIG. 7 is an end elevational view of an embodiment of the mounting device of the present invention positioned within a channel formed in a structural member of an aircraft.
Figure 8:
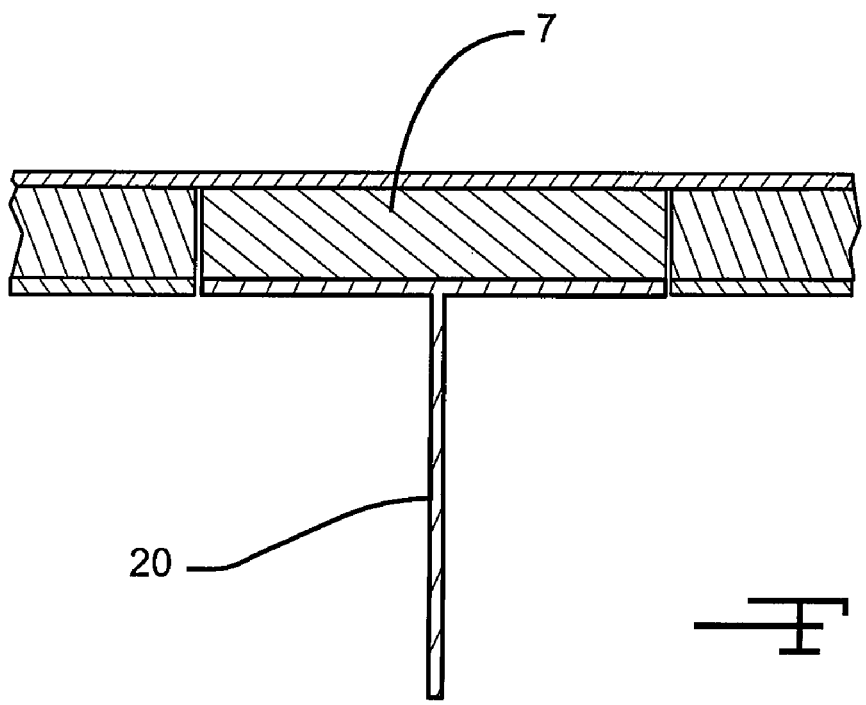
FIG. 8 is an end elevational view of an embodiment of the mounting device of the present invention positioned within a channel formed in a structural member of an aircraft.

The invention is not limited to use as a mounting device in an aircraft wing. As shown in FIGS. 5, 7, and 8 the invention can serve as a mounting device in other structural members of an aircraft. Other structural members contemplated by the invention include but are not limited to a fuselage, fuselage skin, fin, or aileron of an aircraft or a floor or ceiling within an aircraft. In addition, the invention is not limited to a mounting device constructed of a composite member (7) and a metal securement member that is configured in the form of a pi chord (1). As shown in FIG. 7, one example of the mounting device can be constructed of a composite member (7) and a metal securement member configured in the form of an I beam (19). As shown in FIG. 8, one example of the mounting device (6) can be constructed of a composite member (7) and a metal securement member configured in the form of a T chord (20). Other examples of the mounting device include but are not limited to those constructed of a composite member and a metal securement member configured in the form of a J chord, sinewave beam, and F beam in either straight or curved sections (not shown). In addition, various methods known to those skilled in the art can be used to mount or secure structures to the mounting device (6). These methods include but are not limited to those described above and bolting, riveting, welding, curing, and clamping.

We claim:

1. A method of installing a mounting device in a structural member of an aircraft, comprising the steps of:
    assembling a metal securement member by: holding unassembled metal sheets together in a constrained position so that the unassembled metal sheets do not move relative to one another; welding the unassembled metal sheets together with the metal sheets fixedly held in the constrained position so that the metal sheets do not move relative to one another during the welding; and annealing the welded together metal sheets while fixedly maintaining the welded metal sheets in the constrained position so that the welded metal sheets to not move relative to one another during the annealing;
    positioning a mounting device within a channel formed in the structural member, wherein the mounting device comprises the assembled metal securement member and a composite member attached to the metal securement member; and
    attaching the composite member to the structural member within the channel.

2. The method of claim 1 wherein the assembled metal securement member comprises one of a pi chord, T chord, J chord, I beam, sinewave beam, or F beam.

3. The method of claim 2 wherein the assembled metal securement member has a pi chord shape.

4. The method of claim 2 wherein the assembled metal securement member has a T chord shape.

5. The method of claim 2 wherein the assembled metal securement member has a J chord shape.

6. The method of claim 2 wherein the assembled metal securement member has an I beam shape.

7. The method of claim 2 wherein the assembled metal securement member has a sinewave beam shape.

8. The method of claim 2 wherein the assembled metal securement member has a F beam shape.

9. The method of claim 1 wherein the assembled metal securement member comprises:
    a cap member; and
    two spaced apart arms connected to and extending from a first surface of the cap member;
    wherein the composite member is attached to a second surface of the cap member, opposite the first surface.

10. The method of claim 9 wherein the composite member is attached along an entire length and along an entire width of the second surface of the cap member.

11. The method of claim 10 wherein the composite member, the cap member, and the channel all have identical lengths and identical widths.

12. The method of claim 9 wherein the composite member extends beyond a perimeter of the cap member.

13. The method of claim 9 further comprising bonding a spar to and between the two spaced apart arms with an adhesive so that excess of the adhesive seeps out holes, disposed along lengths of the two spaced apart arms, from between the two spaced apart arms to outside of the two spaced apart arms.

14. The method of claim 1 wherein the structural member comprises at least one of a wing, wing skin, fuselage, fuselage skin, fin, aileron, floor, or ceiling.

15. The method of claim 1 further comprising:
    positioning a second mounting device within a second channel formed in the structural member, wherein the second mounting device comprises a second assembled metal securement member and a second composite member attached to the assembled metal securement member; and attaching the second composite member to the structural member within the second channel.

16. The method of claim 15 wherein the structural member is an aircraft wing.

17. The method of claim 16 wherein the mounting device within the channel is positioned opposing the second mounting device in the second channel.

18. The method of claim 17 further comprising attaching a spar to the mounting device and the second mounting device.

19. The method of claim 18 wherein the spar attaches to the mounting device and the second mounting device over substantially an entire length of the wing.

20. An aircraft wing manufactured according the method of claim 1.

21. An aircraft manufactured according to the method of claim 1.

22. The method of claim 1 wherein the metal securement member is made of a titanium alloy.

23. The method of claim 1 wherein the composite member is made of a graphite fiber epoxy laminate.

24. The method of claim 23 wherein the graphite fiber epoxy laminate comprises a lay-up of 70 to 80% zero degree fibers and 20 to 30% forty-five degree fibers.

25. The method of claim 1 wherein the attaching comprises abutting and adhering the composite member to a bottom surface of the channel and to two opposed side surfaces of the channel.

26. The method of claim 1 further comprising vacuum bagging and curing the assembled metal securement member and the composite member in an oven at about atmospheric pressure or in an autoclave at greater than atmospheric pressure.

27. A method of installing a mounting device in a structural member of an aircraft, comprising the steps of:

positioning a mounting device within a channel formed in the structural member, wherein the mounting device comprises a metal securement member, comprising a cap member and two spaced apart arms connected to and extending from a first surface of the cap member, and a composite member attached to a second surface of the cap member opposite the first surface;

attaching the composite member to the structural member within the channel; and bonding a spar to and between the two spaced apart arms with an adhesive so that excess of the adhesive seeps out holes, disposed along lengths of the two spaced apart arms, from between the two spaced apart arms to outside of the two spaced apart arms.

* * * * *